(12) United States Patent
Temmesfeld (10) Patent No.: US 9,071,020 B2
(45) Date of Patent: Jun. 30, 2015

(54) LOCKING SYSTEM FOR A PLUG COUPLING DEVICE ARRANGED ON A MOTOR VEHICLE, A CHARGING STATION OR A WALL

(75) Inventor: Thomas Temmesfeld, München (DE)

(73) Assignee: TEMTEC FAHRZEUGTECHNIK ENTWICKLUNGSGESELLSCHAFT MBH, Raubling (DE)

( * ) Notice: Subject to any disclaimer, the term of this patent is extended or adjusted under 35 U.S.C. 154(b) by 47 days.

(21) Appl. No.: 14/110,496

(22) PCT Filed: Mar. 29, 2012

(86) PCT No.: PCT/EP2012/001394
§ 371 (c)(1),
(2), (4) Date: Oct. 23, 2013

(87) PCT Pub. No.: WO2012/136328
PCT Pub. Date: Oct. 11, 2012

(65) Prior Publication Data
US 2014/0057468 A1    Feb. 27, 2014

(30) Foreign Application Priority Data
Apr. 8, 2011    (DE) .......................... 10 2011 016 481

(51) Int. Cl.
*H01R 13/639*    (2006.01)
*B60L 11/18*    (2006.01)
*H01R 13/447*    (2006.01)

(52) U.S. Cl.
CPC .......... *H01R 13/639* (2013.01); *B60L 11/1818* (2013.01); *H01R 13/447* (2013.01); *H01R 2201/26* (2013.01); *Y02T 90/14* (2013.01); *H01R 13/6397* (2013.01); *Y02T 10/7005* (2013.01)

(58) Field of Classification Search
CPC ............. H01R 2201/26; H01R 13/639; H01R 13/6397
USPC ................................... 439/528, 700
See application file for complete search history.

(56) References Cited

U.S. PATENT DOCUMENTS 5,954,528 A * 9/1999 Ono et al. ..................... 439/157
7,404,720 B1 * 7/2008 Frey et al. ..................... 439/133

(Continued)

FOREIGN PATENT DOCUMENTS

| DE | 37 28 275 | 3/1989 |
| DE | 10 2008 048310 | 4/2009 |
| DE | 20 2009 004249 | 6/2009 |
| EP | 2 293 391 | 3/2011 |
| WO | WO 2010/115927 | 10/2010 |

OTHER PUBLICATIONS

International Search Report for PCT/EP2012/001394, mailed Oct. 12, 2012.

(Continued)

*Primary Examiner* — Truc Nguyen
(74) *Attorney, Agent, or Firm* — Nixon & Vanderhye P.C.

(57) ABSTRACT

The invention relates to a locking system for a plug coupling device and to a plug coupling device having a housing in which the locking system according to the invention is arranged. A plug having a projection, which may for example be a guide pin of a commercially available safety plug, can be coupled to the plug coupling device by means of the locking system according to the invention, wherein a locking device in the form of a slider engages behind the projections of the plug such that the plug coupled to the plug coupling device cannot be removed from the plug coupling device. In addition, the locking device being in the locking position prevents an unauthorized insertion of a plug into the plug coupling device.

20 Claims, 9 Drawing Sheets

(56) References Cited

U.S. PATENT DOCUMENTS

| | | | |
|---|---|---|---|
| 8,712,648 B2* | 4/2014 | Charnesky | 701/49 |
| 2008/0293275 A1* | 11/2008 | Osada et al. | 439/188 |
| 2012/0088382 A1* | 4/2012 | Konchan | 439/153 |
| 2012/0129378 A1* | 5/2012 | Kiko et al. | 439/345 |
| 2013/0102163 A1* | 4/2013 | Basavarajappa et al. | 439/34 |

OTHER PUBLICATIONS

International Preliminary Report on Patentability for PCT/EP2012/001394, dated Apr. 3, 2013.

* cited by examiner

LOCKING SYSTEM FOR A PLUG COUPLING DEVICE ARRANGED ON A MOTOR VEHICLE, A CHARGING STATION OR A WALL

This application is the U.S. national phase of International Application No. PCT/EP2012/001394 filed 29 Mar. 2012 which designated the U.S. and claims priority to DE Patent Application No. 10 2011 016 481.2 filed 8 Apr. 2011, the entire contents of each of which are hereby incorporated by reference.

The invention relates to a locking system for a plug coupling device which is arranged on a motor vehicle, on a charging station or on a wall and which can be coupled with a plug, according to the preamble of claim 1, and the invention also relates to a plug coupling device according to claim 20.

It is known to charge electric cars or electrically driven bicycles (also known as pedelecs) or, quite generally, devices which have a rechargeable battery, using an electric charging cable. A charging cable of this type has at least one plug which can be inserted into a plug coupling device ("socket") which is located, for example, on the motor vehicle. The other end of the charging cable can, for example, be directly electrically connected to a charging station or alternatively can comprise a further plug which can be inserted into a socket of a charging station or into a socket arranged in a wall.

During a charging procedure, there is the risk of an unauthorised tapping of current. This could happen if the charging cable is removed from the electrical device to be charged and is inserted into another electrical device, so that the other electrical device is charged with "foreign" current. On the other hand, a current cable plug could be removed from a charging station and inserted in an unauthorised manner into another "foreign" charging station.

To prevent a "theft of current" of this type, the plug coupling devices can have a locking system, by which the plug can be locked with the plug coupling device. A corresponding locking system prevents a plug from being removed in an unauthorised manner from a plug coupling device. According to the prior art, an unauthorised coupling of a plug with a socket is resolved by a socket which can be closed by a cover flap.

In locking systems according to the prior art, the plug housing has an indentation or a recess into which a locking bolt of the locking system can engage. Consequently, plugs of a specific configuration are required for corresponding locking systems. In the field of small motor vehicles or of electrically driven bicycles, the batteries used in these vehicles often only have a relatively small charging capacity, so that they can be charged using a conventional electric cable having a safety plug, without excessively long charging times. A safety plug usually provides current with a voltage of between 220 V and 240 V at a frequency of between 50 Hz and 60 Hz.

The housings of corresponding safety plugs have projections in the form of guide webs, by which the safety plugs are guided into sockets. These safety plugs cannot be coupled or locked with a socket in which a locking system of the prior art is used.

The object of the invention is to provide a locking system of the type mentioned at the outset which can be operated very easily and which on the one hand prevents, in a simple and reliable manner, the unauthorised removal of a plug, having a projection, from a plug coupling device and, on the other hand, prevents an unauthorised coupling of a plug, having a projection, with a plug coupling device.

The object is achieved by a locking system having the features of claim 1 and by a plug coupling device having the features of claim 21. Advantageous embodiments of the invention are described in the further claims.

In the locking system according to the invention, to lock the plug which is coupled with the plug coupling device and which has at least one projection on the housing thereof, a locking device is provided which can be moved between an unlocked position in which the plug can be coupled with the plug coupling device and a locked position in which the plug coupled with the plug coupling device is locked. The movement of the locking device can be produced manually and/or by a motor. The locking device can be moved manually or actuated manually, for example, by a shackle, connected to a drive shaft, of a lock, it being possible to effect the drive shaft, for example, by turning a key inserted into the lock. The shackle of the lock then serves as a transmission and/or as a transmission element and/or as part of a transmission between the drive shaft and the locking device. In this respect, in the locked position, the locking device engages behind the projection of the plug so that the plug coupled with the plug coupling device cannot be removed from the plug coupling device.

Thus, according to the invention, plugs which have at least one projection (for example safety plugs having guide webs) can be locked by the locking system by engagement behind the projection. The plugs are therefore protected against an unintentional or unauthorised removal from the socket equipped with the locking system. Furthermore, the locking system according to the invention can prevent an unintentional or unauthorised coupling of a plug with the socket.

In this respect, the locking system can be of a very simple and compact construction, since only a few additional parts are required for the system. Therefore, a plug coupling device equipped with the locking device according to the invention is also of a very compact construction so that, for example, indentations or recesses which already exist in walls can continue to be used in order to accommodate therein a plug coupling device which has the locking system according to the invention. Plug coupling devices of a corresponding compact construction can be fitted on small vehicles, and also for example on electric bicycles. The locking system is economical to produce and can be operated with a very simple control logic.

According to one advantageous embodiment, in the unlocked position of the locking device, into which position the locking device is brought by a drive motor and by a drive device comprising a transmission, a driving element of the transmission and a coupling element of the transmission adopt a position in which a movement of the locking device towards the locked position is prevented by a force exerting device which can be realised, for example, in the form of a spring element. A corresponding embodiment ensures that a plug can be reliably coupled with the plug coupling device.

According to a further advantageous embodiment, the force-exerting device is a spring element which exerts a force onto the locking device. The drive device moves the locking device out of the locked position into the unlocked position against the force exerted by the spring element. The locking device can then be moved by the spring element from the unlocked position into the locked position. Consequently, the drive device introduces energy into the spring element, and the locking device can be brought into the locked position again by the energy introduced into the spring element. Thus, the construction of the locking system is simplified and, due to the simple mechanical configuration, is hardly susceptible to defects.

According to another advantageous embodiment, the locking system further comprises a cover flap which can be moved between a closed position in which the cover flap closes the plug coupling device, and an open position in which a plug can be coupled with the plug coupling device. The locking device further comprises a rocker, by which the coupling element is coupled with the cover flap. The cover flap protects the plug coupling device against external influences, for example against the effects of the weather. Furthermore, the cover flap also counteracts an unauthorised removal of a plug from, or insertion of a plug into the plug coupling device.

According to one advantageous embodiment, the coupling rod, the rocker and the cover flap are configured such that in the closed position of the cover flap, the locking device is in the locked position, and in the open position of the cover flap, the locking device is in the unlocked position. When the locking device is transferred from the unlocked position into the locked position, the cover flap moves by a predetermined distance and/or by a predetermined angle towards the closed position. As a result, in addition to the safeguarding provided by the locking device, the plug coupled with the plug coupling device is secured by the cover flap against unauthorised removal, because the cover flap is lowered onto the plug housing with a predetermined force.

According to one advantageous embodiment, when the cover flap has moved towards the closed position by the predetermined distance and/or by the predetermined angle, the connecting link of the cover flap and the rocker adopt a position in which, during the movement of the cover flap towards its open position, the rocker is not actuated by the connecting link of the cover flap, so that the rocker remains in its position and the locking device coupled with the rocker via the coupling element remains in the locked position. Therefore, when the cover flap is opened manually, a plug coupled with the plug coupling device remains locked by the locking device, so that in spite of the cover flap being opened, the plug cannot be removed. "Theft of current" is reliably prevented thereby.

According to one advantageous embodiment, in the closed position of the cover flap, the connecting link of the cover flap and the rocker adopt a position in which the cover flap and the rocker are blocked against rotation when force is introduced manually via the cover flap, so that the cover flap is prevented from moving into the open position. As a result, a manual opening of the cover flap is prevented so that it is possible to reliably prevent a "theft of current".

In the following, the invention will be described in more detail by way of example with reference to the drawings.

The locking system according to the invention is used so that a plug which has at least one projection cannot be removed in an unauthorised manner from a plug coupling device, and so that the plug cannot be inserted in an unauthorised manner into the plug coupling device. It is presumed that the mode of operation of a conventional plug coupling device or socket is known, so that a detailed description of an electrical coupling of a plug with a conventional plug coupling device is not provided.

Figure 1:
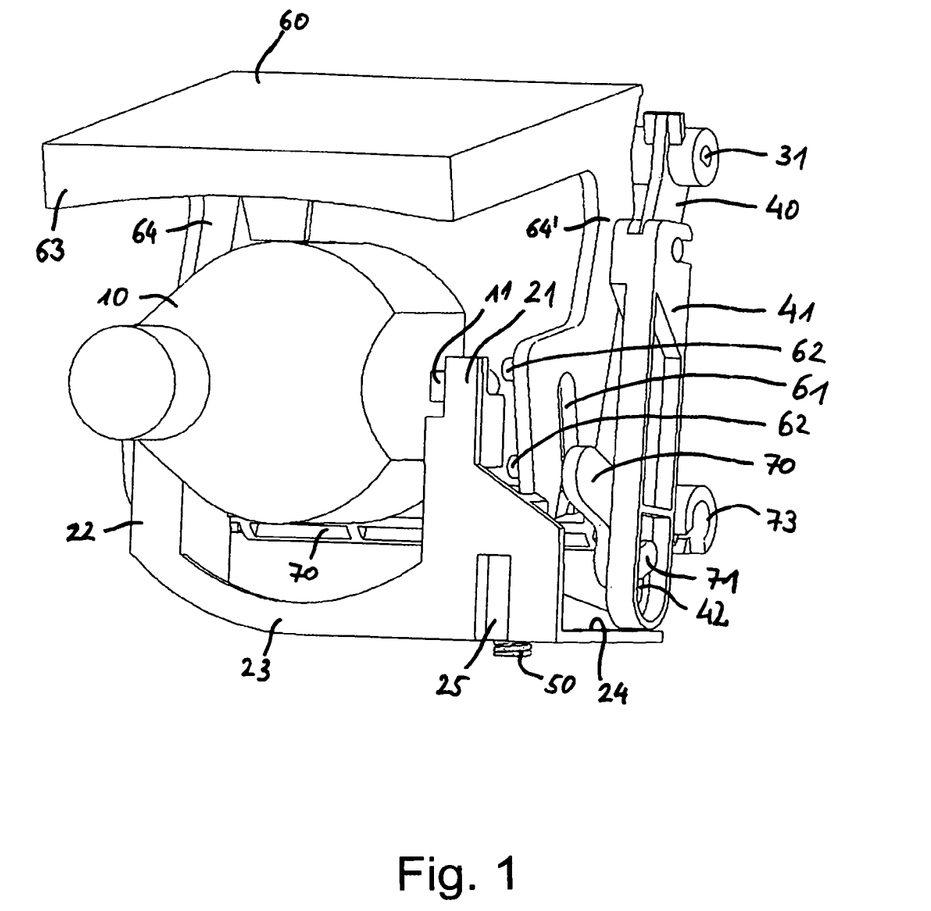
FIG. 1: is a spatial representation of the locking system according to the invention in an unlocked state with an inserted plug.
Figure 3:
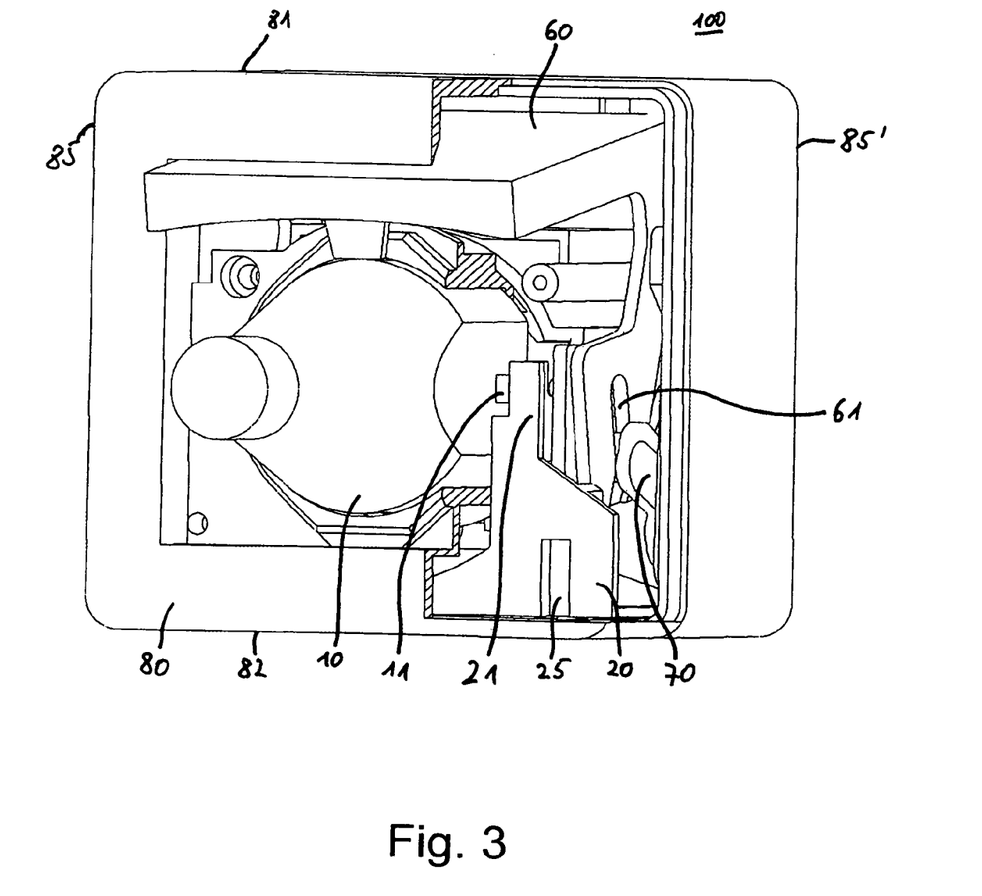
FIG. 3 is a spatial representation of a plug coupling device having a locking system according to the invention in an unlocked state.
Figure 5:
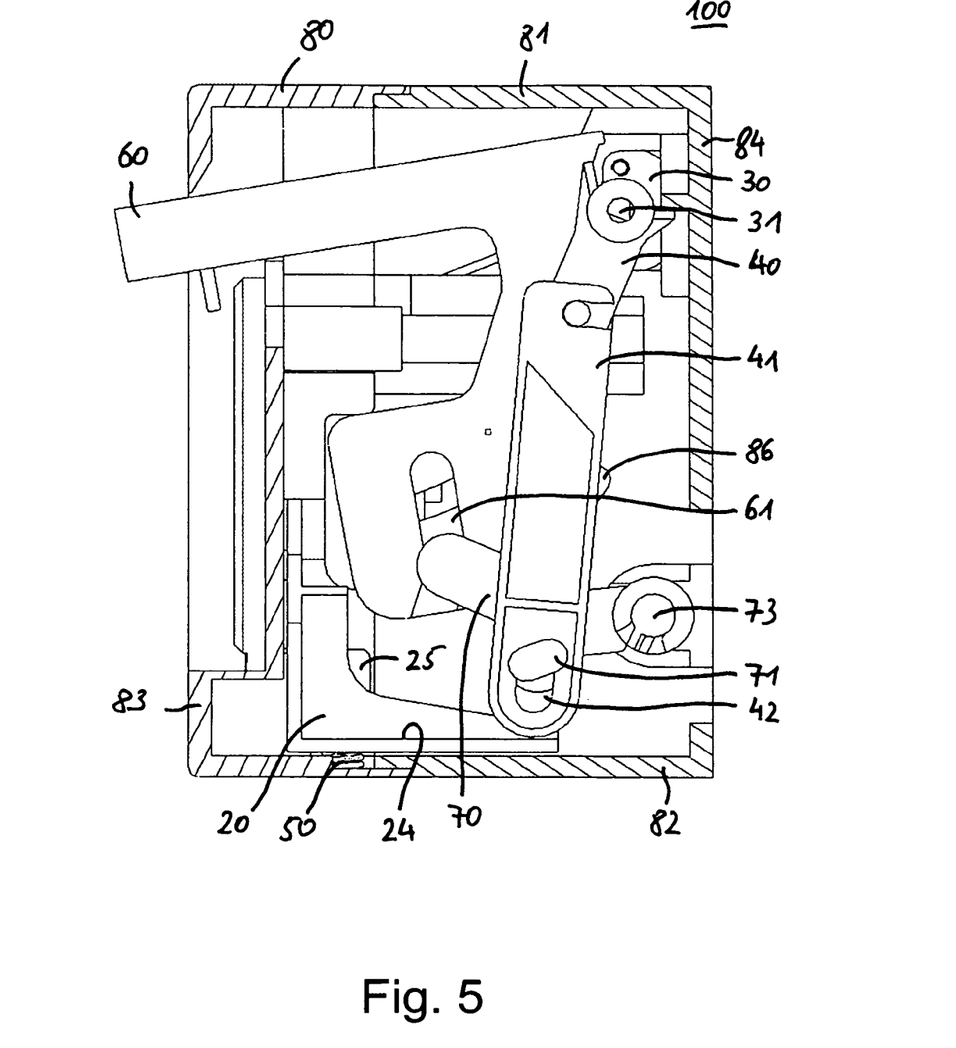
FIG. 5 is a cross-sectional view of the plug coupling device, illustrated in FIG. 3, without a plug.

FIG. 1 is a spatial representation of a locking system according to the invention for a plug coupling device 100, the plug coupling device 100 not being shown in this figure. FIG. 3 is a spatial representation of a plug coupling device 100 which comprises a housing 80, into which the locking system according to the invention is integrated. FIG. 5 is a lateral sectional view of the plug coupling device 100 shown in FIG. 3.

The locking system comprises a locking device 20. In FIGS. 1, 3 and 5, the locking device 20 is in an unlocked position in which a plug 10 can be coupled with or uncoupled from the plug coupling device 100. A plug 10 is coupled with the plug coupling device 100 by inserting the plug 10 into the plug coupling device 100. The plug 10 is uncoupled from the plug coupling device 100 by removing or pulling out the plug 10 from the plug coupling device 100.

The locking system further comprises a drive device comprising a drive motor 30 having a drive shaft 31 and a transmission 40, 41. The drive motor 30 is preferably an electric motor. The transmission consists of a multi-part driving linkage 40, 41 in the form of a driving element 40 and a coupling element 41. The driving element 40 is connected to the drive shaft 31 of the drive motor 30 for co-rotation. The driving element 40 is also articulated with the coupling element 41. The coupling element 41 can be brought into contact with an impact surface 24 of the locking device 20.

The drive motor 30 and the locking device 20 are arranged in opposite end regions of the housing 80. FIGS. 3 and 5 show that the motor is arranged in the region of the top 81 of the housing 80. On the other hand, the locking device 20 is arranged in the region of the bottom 82 of the housing 80. The driving element 40 and the coupling element 41 are arranged between the motor 30 and the locking device 20.

In the unlocked position, the driving element 40 and the coupling element 41 are arranged approximately on a line, so that the driving element 40 and the coupling element 41 include an obtuse angle of approximately 180°. Consequently, the driving element 40 presses the coupling element 41 at the maximum towards the bottom 82 of the housing 80. In this respect, the coupling element 41 acts as a tappet and acts on an impact surface 24 of the locking device 20.

A force-exerting device 50 in the form of a spring element 50 is arranged in a pocket 25 of the locking device 20 between the bottom 82 of the housing and the locking device 20. The spring element 50 which is illustrated in the figures as a spiral spring can alternatively also be realised as one or more cup springs or generally as pressure springs. The spring element 50 can move the locking device 20 from the unlocked position into a locked position. In FIGS. 2, 4, 6 and 7, the locking device 20 is illustrated in its locked position.

In the unlocked position of the locking device 20, the spring element 50 is compressed and thus exerts a force on the locking device 20 towards the locked position. Since the coupling element 41 includes an obtuse angle of approximately 180° with the driving element 40, the spring element 50 also exerts almost no torque on the drive shaft 31 of the drive motor 30. The holding torque of the drive motor 30 is greater than the torque exerted by the spring element 50 on the drive shaft 31, so that the drive motor 30 holds the locking device 20 against the force of the spring element 50 in the unlocked position.

It would also be possible for the coupling element 41 and the drive shaft 40 to be located exactly on a line, i.e. for them to include an angle of 180°, so that no torque whatsoever would be exerted on the drive shaft 30 due to the force exerted by the spring element 50.

Therefore, in the unlocked position of the locking device 20, the driving element 40 and the coupling element 41 adopt a position in which a movement of the locking device 20 towards the locked position is prevented by the exertion of force by the spring element 50. Consequently, in the unlocked position, the transmission adopts a self-locking position.

To transfer the locking device 20 from the unlocked position into the locked position, the motor 30 rotates the driving element 40 such that the driving element 40 lifts the coupling element 41. To achieve this, in the figures, the drive motor 30 rotates the driving element 40 in a clockwise direction. The coupling element 41 moves away from the bottom 82 of the housing and, due to this release, the spring element 50 pushes the locking system 20 upwards towards the top 81 of the housing into the locked position.

Figure 8:
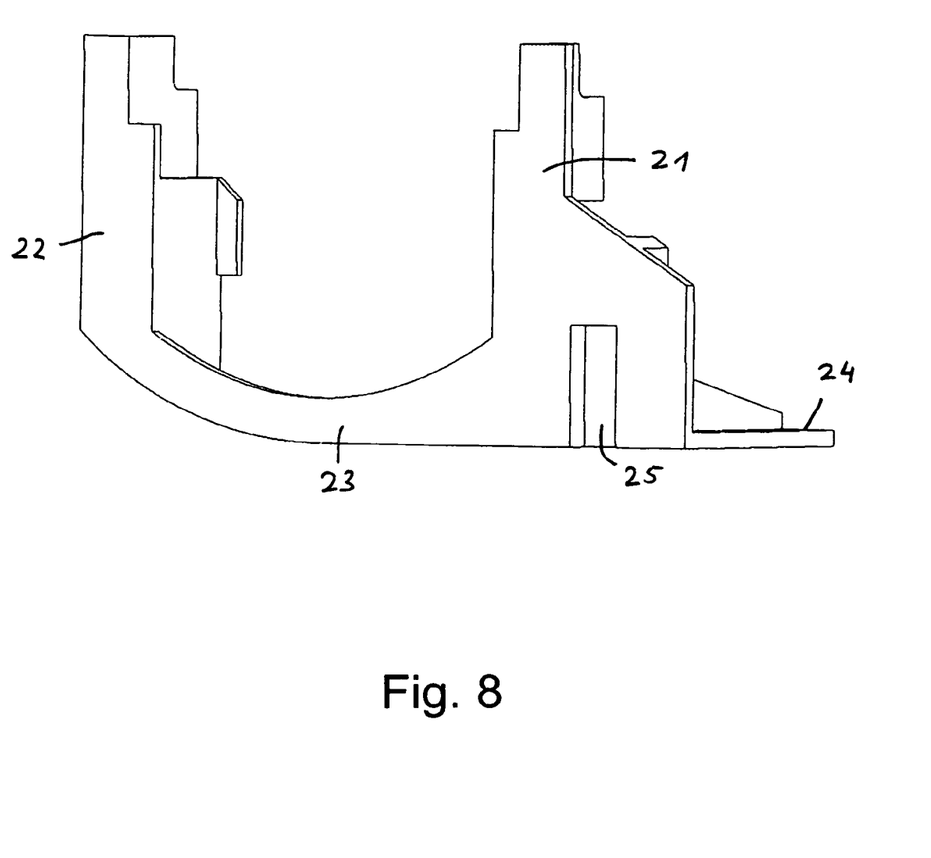
FIG. 8: is a spatial representation of the front of the locking device.
Figure 9:
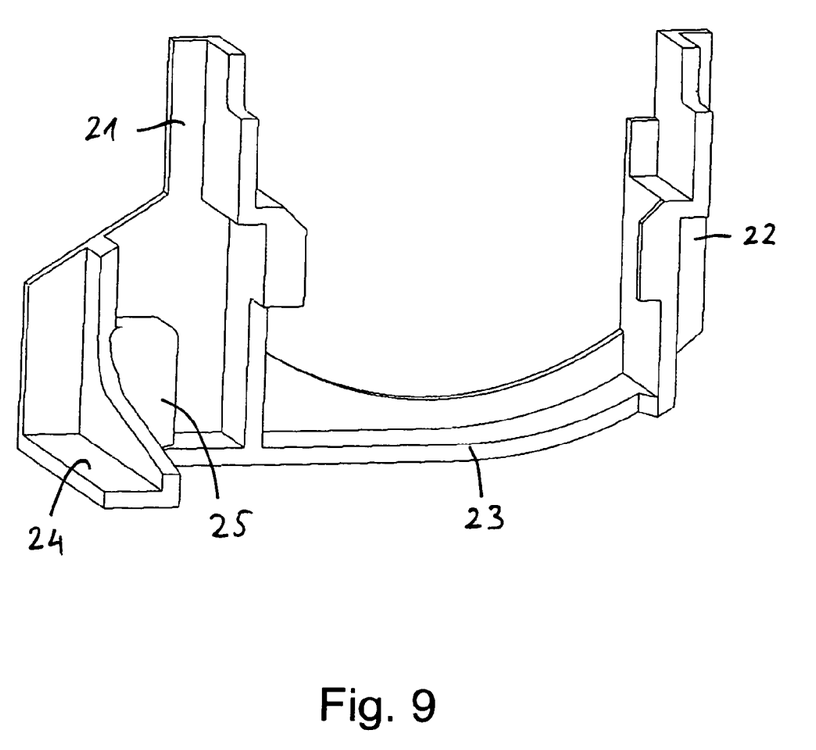
FIG. 9: is a spatial representation of the back of the locking device.

FIGS. 8 and 9 show that the locking device 20 comprises a first strut 21 and a second strut 22 which are arranged in the region of the side walls 85, 85' of the housing 80. The first strut 21 and the second strut 22 are interconnected by a material web 23. Consequently, the locking device 20 is configured in a U shape.

When the plug 10 is coupled with the plug coupling device 100, in the locked position, the first strut 21 and the second strut 22 of the locking device 20 engage behind the projections 11 of the plug housing. In the figures, the plug 10 is a safety plug 10 and the projections 11 are guide webs or guide pins 11 of the plug 10 which are usually used to ensure that a safety plug 10 can be inserted into a socket in a correctly oriented manner.

To transfer the locking device 20 from the locked position into the unlocked position, the drive motor 30 has to press the coupling element 41 towards the bottom 82 of the housing. To achieve this, the drive motor 30 rotates the driving element 40 in an anticlockwise direction. In this respect, the drive motor 30 presses the coupling element 41 against the force exerted by the spring element 50 towards the unlocked position. As a result, the spring element 50 is again compressed so that stored in the spring element 50 is an energy which can be used again to bring the locking device 20 into the locked position when released by the coupling element 41.

In the illustrated locking system, the direction of movement of the locking device 20 is oriented vertically to the insertion direction of the plug 10 into the plug coupling device 100. Furthermore, the impact surface 24 of the locking device 20 is oriented vertically to the direction of movement of the locking device 20.

Figure 7:
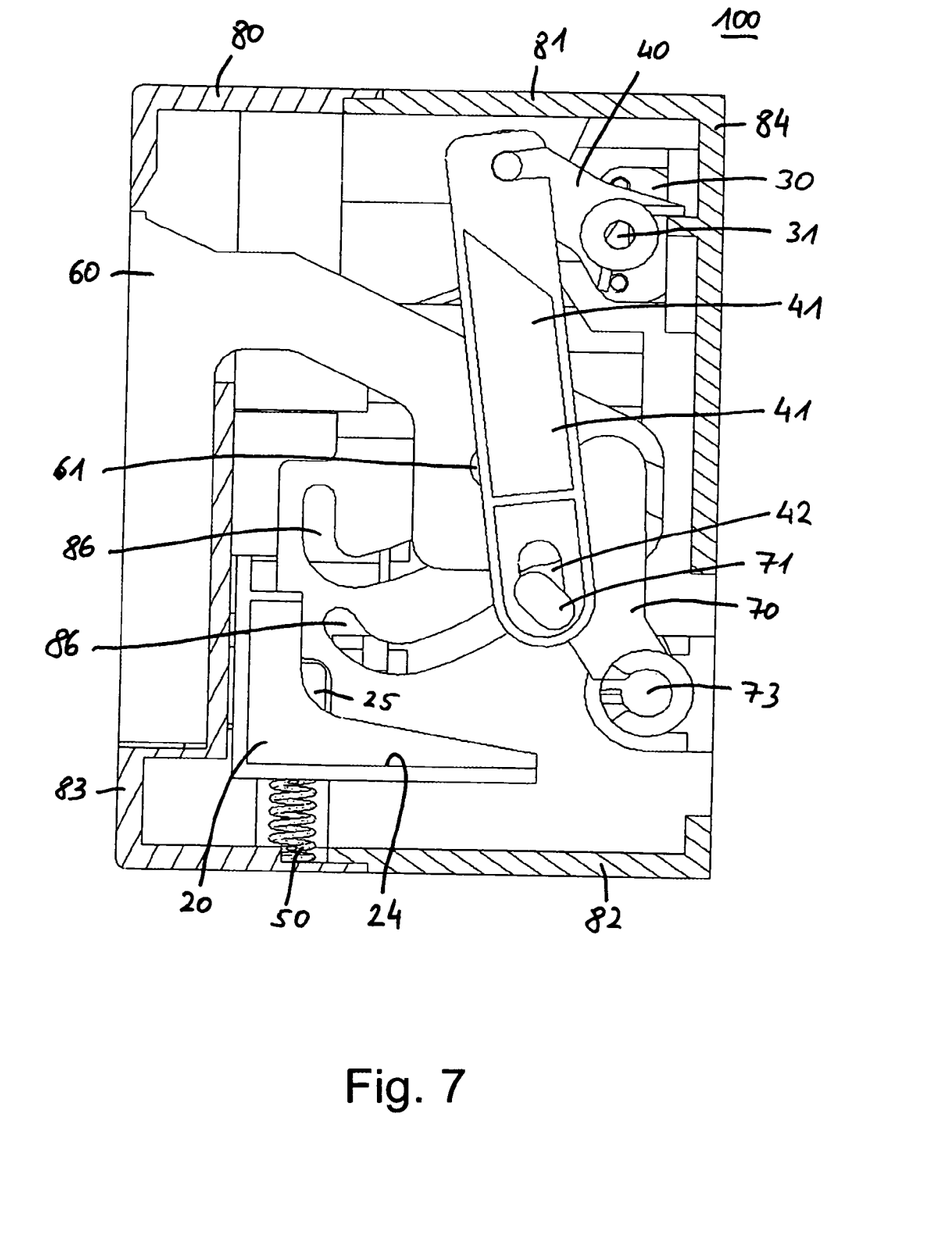
FIG. 7: shows the plug coupling device illustrated in FIGS. 5 and 6 with a cover flap in the closed position.

The locking system according to the invention can also comprise a cover flap 60. The cover flap 60 can be moved between a closed position and an open position. The closed position is shown in FIG. 7, while the open position of the cover flap 60 is shown in FIGS. 1, 3 and 5.

The cover flap 60 comprises a lid 63 and two limbs 64, 64'. The cover flap limbs 64, 64' are arranged in the region of the side walls 85, 85' of the housing 80. In the closed position of the cover flap 50, the cover flap lid 63 and the front 83 of the housing 80 form a continuous surface (FIG. 7). A respective cover flap connecting link 61 in the form of a slot 61 is configured in each of the cover flap limbs 64, 64'.

The locking system illustrated in the figures also comprises a rocker 70 by which the coupling element 40 is coupled with the cover flap 60. The rocker 70 is mounted rotatably in the housing 80 by pins (not shown) of the housing 80. In this respect, the pin axes of the housing 80 coincide with a pivot axis 73 of the rocker 70, so that the rocker 70 can be pivoted about the pivot axis 73.

The rocker 70 comprises a first link pin 71 and a second link pin 72. The first link pin 71 is guided displaceably in a connecting link 42 of the coupling element 41. In this respect, the coupling element connecting link 42 is arranged in the region of the coupling element 41 which is opposite the contact region between the coupling element 41 and the driving element 40. The second link pin 72 is guided displaceably in the cover flap connecting link 61.

It can be seen from FIGS. 1 and 5 that in the unlocked position of the locking device 20, the first link pin 71 is in contact with the upper stop of the coupling element connecting link 42. Furthermore, the second link pin 72 is in contact with the lower stop of the cover flap connecting link 61. By lifting the coupling element 41, which is carried out by the drive motor 30 and by the driving element 40, the coupling element connecting link 42 is also moved upwards, without entraining the first link pin 71. Consequently, the coupling element 41 and the rocker 70 are uncoupled in a specific region which depends on the length of the coupling element connecting link 42. After the coupling element 41 has been lifted by a predetermined distance which correlates with the length of the coupling element connecting link 42, the first link pin 71 is in contact with the lower stop of the coupling element connecting link 42. By lifting the coupling element 41 further, the rocker 70 is driven clockwise about the pivot axis 73, so that the second link pin 72 is moved from the lower stop of the cover flap connecting link 61 towards the upper stop or towards the centre of the cover flap connecting link 61 (FIG. 6).

The cover flap 60 comprises on each of the cover flap limbs 64, 64' respectively two cover flap link pins 62. These cover flap link pins 62 are guided displaceably in connecting links 86 of the housing 80. FIG. 7 shows that the housing connecting links 86 comprise horizontal and vertical components, so that as a result of the guidance of the cover flap in the housing connecting link 86 or links 86, the cover flap 60 performs both a pivoting and a rotating movement.

Due to the movement of the second link pin 72 from the lower stop of the cover flap connecting link 61 towards the centre of the cover flap connecting link 61, the cover flap 60 moves by a predetermined distance and by a predetermined angle towards the closed position. Therefore, when the plug 10 is coupled in the plug coupling device 100, the cover flap lid 63 sinks onto the plug housing and presses thereon with a predetermined force, so that in addition to the engagement of the locking device 20 behind the guide webs 11 of the plug, the cover flap 60 also counteracts a removal of the plug 10 from the plug coupling device 100.

Figure 6:
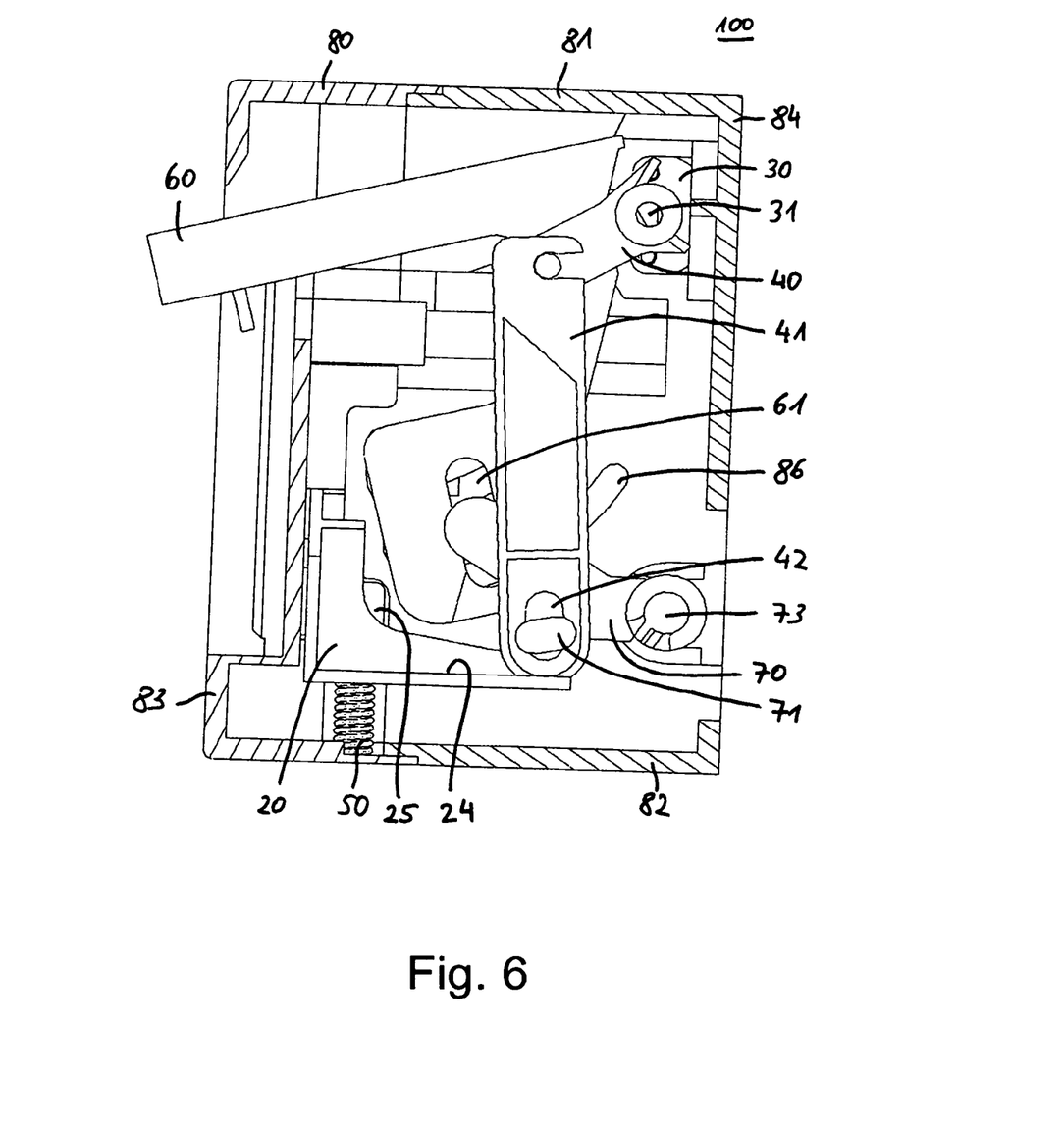
FIG. 6: is a cross-sectional view of the plug coupling device, illustrated in FIG. 4, without a plug.

In the position illustrated in FIG. 6, in which the cover flap lid 63 has been moved towards the closed position by the predetermined distance and by the predetermined angle, the cover flap connecting link 61 and the rocker 70 adopt a position in which, when the cover flap 60 is moved towards its open position, the rocker 70 is not actuated by the cover flap connecting link 61, since the second link pin 72 is located approximately in the centre of the cover flap connecting link 61. Therefore, the rocker 70 remains in its position and the locking device 20 coupled with the rocker 70 by the coupling element 41 remains in the locked position.

Figure 2:
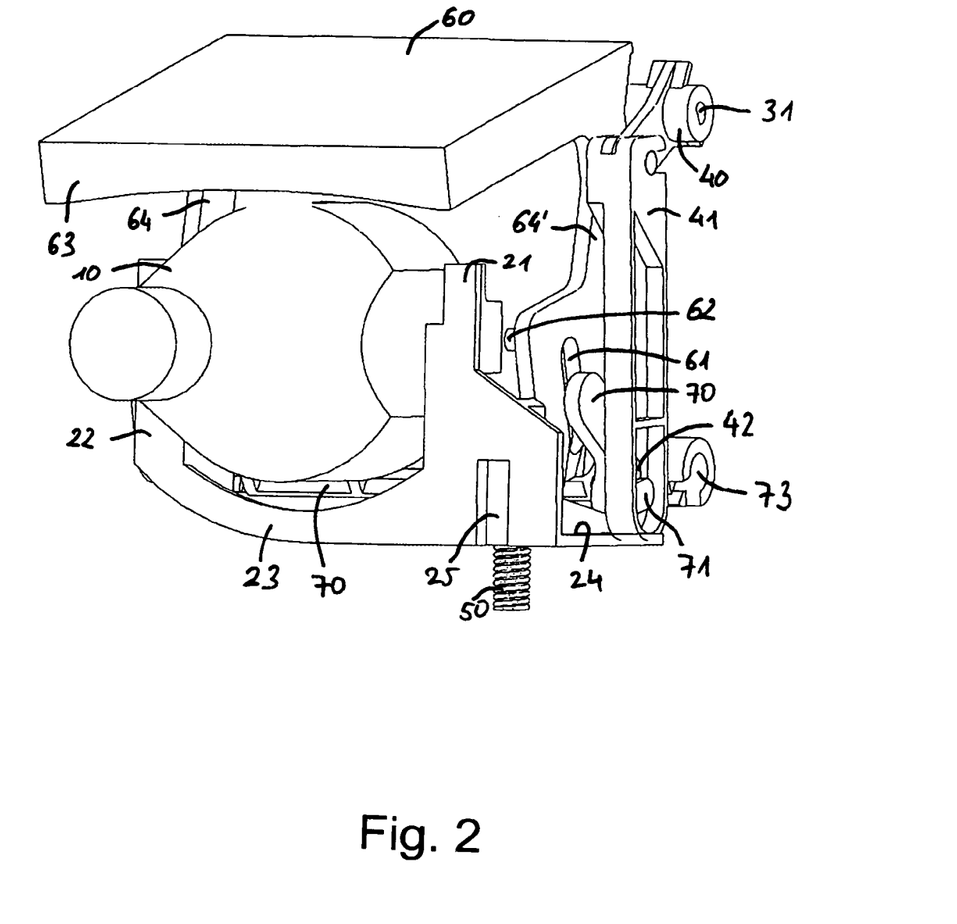
FIG. 2: shows the locking system illustrated in FIG. 1 in a locked state in which a plug is locked with a plug coupling device.
Figure 4:
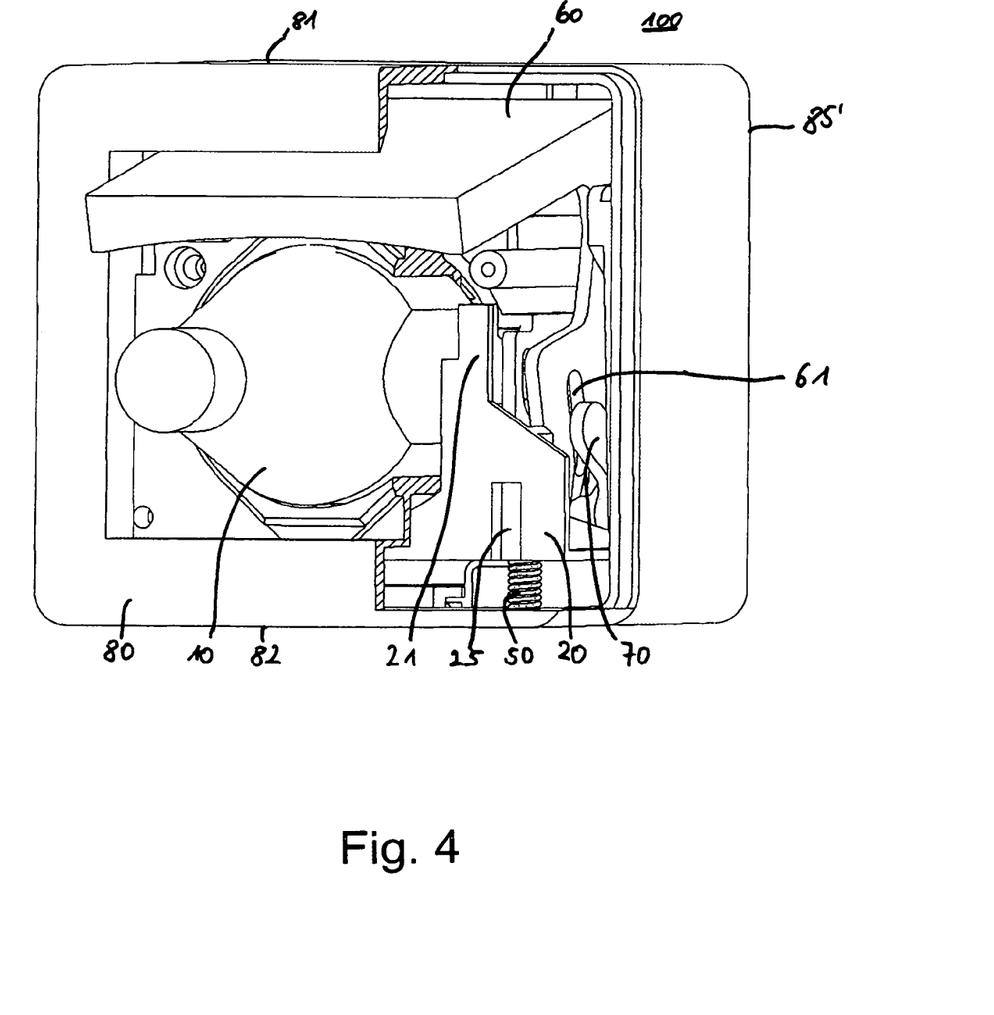
FIG. 4 shows the plug coupling device, illustrated in FIG. 3, in a locked state.

If, for example, a "current thief" manually pushes the cover flap 60 upwards into the open position from the position shown in FIGS. 2, 4 and 6, then as a result the cover flap connecting link 61 also moves from the position shown in FIG. 6 into the position shown in FIG. 5. The second link pin 72 slides from the central position in the cover flap connecting link 61 to the lower stop of the cover flap connecting link 61. Consequently, the coupling element 41 is not driven by a movement of the cover flap 60, so that the locking device 20 is not pressed downwards towards the unlocked position by the coupling element 40. It is thereby ensured that if the cover flap 60 is actuated manually, the locking device 20 remains in the locked position, so that the plug 10 cannot be removed from the plug coupling device 100.

FIG. 7 is a lateral sectional view of the plug coupling device 100 according to the invention, the cover flap 60 being in the closed position. In the closed position of the cover flap 60, the locking device 20 is in the locked position. Thus, the closed cover flap 60 and also the locking device 20 in the locked position counteract insertion of a plug 10 into the plug coupling device 100. Consequently, it is also impossible for a plug 10 to be coupled, should the plug coupling device 100 according to the invention not have a cover flap 60.

In the closed position of the cover flap 60, the cover flap connecting link 61 and the rocker 70 adopt a position in which, during the manual introduction of force via the cover flap 60, they are blocked against rotation towards the open position of the cover flap 60, so that a manual transfer of the cover flap 60 into the open position is prevented. In the closed position of the cover flap 60, the second link pin 72 is located at the lower stop of the cover flap connecting link 61. As the result of a manual introduction of force into the cover flap 60 towards the open position, a force is introduced via the cover flap limbs 64, 64' onto the rocker 70 via the second link pin 72, which force is directed towards the bottom 82 of the housing. In this position, the manually introduced force cannot exert any torque on the rocker 70, as the force vector passes from the contact point of the second link pin 72 with the cover flap connecting link 62 through the pivot axis 73 of the rocker 70, so that it is impossible to pivot the rocker 70 by the manual introduction of force.

On the other hand, when the coupling element 41 is driven by the driving element 40 and the drive motor 30, the coupling element 41 is pressed towards the bottom 82 of the housing, the first link pin 71 of the rocker 70 being moved relatively from the lower stop to the upper stop at the start of the movement of the coupling element 41 in the coupling element connecting link 42, so that only after a predetermined angular movement of the drive motor 30 does the coupling rod 41 drive the rocker 70 in an anticlockwise direction. In this respect, the coupling element 41 exerts a torque on the rocker 70. Consequently, the rocker 70 can be moved in an anticlockwise direction due to the motor-drive of the transmission, so that the cover flap 60 is moved towards the open position. At the end of the movement of the coupling element 41, the lower end face of the coupling element 41 acts on the impact surface 24 of the locking device 20 and forces the locking device 20 out of the locked position towards the unlocked position, so that the plug coupling device 100 can again be coupled with a plug 100.

The locking system according to the invention and the plug coupling device 100 according to the invention reliably prevent a plug 10, coupled with the plug coupling device 100, from being removed or pulled out of the plug coupling device 100 in an unauthorised manner. They also reliably prevent a plug 10 from being inserted or coupled into a plug coupling device 100, which is in the locked position, in an unauthorised manner, since the locking device 20 prevents the insertion of the plug 10 into the plug coupling device 100. Consequently, the functionality of the plug coupling device 100 according to the invention and of the locking system according to the invention is not dependent on the cover flap. However, as described above, it is possible, using the cover flap 60, to also counteract the removal of a plug 10 coupled with the plug coupling device 100, because in the locked position of the locking device 20, the cover flap 60 or the cover flap lid 63 is lowered onto the plug housing with a predetermined force and it thereby also counteracts the removal of the plug 10 from the plug coupling device 100. Furthermore, in the closed position of the cover flap 60, the cover flap lid 63, which terminates flush with the front 83 of the housing, prevents the insertion or coupling of the plug 10 into the plug coupling device 100. The cover flap 60 also protects the plug coupling device 100 from the effects of the weather, for example.

LIST OF REFERENCE NUMERALS

10 plug
11, 11' projection (of plug), guide pin
20 locking device, slider
21 first strut (of locking device)
22 second strut (of locking device)
23 material web (of locking device)
24 impact surface (of locking device)
25 pocket (of locking device)
30 drive motor, drive device
31 drive shaft
40 driving element, transmission
41 coupling element, transmission
42 coupling element connecting link
50 force-exerting device, spring element
60 cover flap
61 cover flap connecting link
62 cover flap link pin
63 cover flap lid
64, 64' cover flap limb
70 rocker
71 first link pin (of rocker)
72 second link pin (of rocker)
73 pivot axis (of rocker)
80 housing
80 top of housing
81 bottom of housing
82 front of housing
83 back of housing
85, 85' side wall (of housing)
86 housing connecting link
100 plug coupling device

The invention claimed is:

1. Locking system for a plug coupling device (100) which can be coupled with a plug (10) having at least two projections (11, 11'), comprising:
   a locking device (20) for locking the plug (10) with the plug coupling device (100);
   a drive device (30, 31, 40, 41) for moving the locking device (20) between an unlocked position in which the plug (10) can be coupled with the plug coupling device (100), and a locked position in which the plug (10) coupled with the plug coupling device (100) is locked;
   the drive device (30, 31, 40, 41) comprising a drive shaft (31) and a transmission (40, 41) between the drive shaft (31) and the locking device (20), characterised by the following features:
   the locking device (20) comprises a first strut (21, 22) and a second strut (21, 22) with spacing therefrom, the two of which extend mutually parallel in the movement direction of the locking device (20) and are interconnected by a material web (23); and two projections (11, 11') of the plug (10) are engaged from behind by the first strut (21, 22) and the second strut (21, 22) when the locking device is in the locked position, so that the plug (10) coupled with the plug coupling device (100) cannot be removed from the plug coupling device (100).

2. Locking system according to claim 1, characterised in that the drive device (30, 31, 40, 41) further comprises a drive motor (30) which is configured to drive the drive shaft, the transmission (40, 41) being arranged between the drive motor (30) and the locking device (20).

3. Locking system according to claim 1, characterised in that the transmission (40, 41) between drive shaft (31) and locking device (20) comprises a multi-part driving linkage (40, 41) for the locking device (20) with articulated linkage elements (40, 41).

4. Locking system according to claim 1, characterised by the following features:
the transmission (40, 41) comprises a driving element (40) and a coupling element (41);
the driving element (40) is connected to the drive shaft (31) for co-rotation;
the coupling element (41) is articulated with the driving element (40) and can be driven by the driving element (40).

5. Locking system according to claim 4, characterised in that the locking device (20) can be transferred from the locked position into the unlocked position by the coupling element (41).

6. Locking system according to claim 1, characterised by the following features:
the locking system further comprises a force-exerting device (50) which exerts a force, directed in the locked position, onto the locking device (20);
the drive device (30, 31, 40, 41) moves the locking device (20) from the locked position into the unlocked position;
the locking device (20) can be moved from the unlocked position into the locked position by the force-exerting device (50).

7. Locking system according to claim 6, characterised in that in the unlocked position of the locking device (20), the driving element (40) and the coupling element (41) adopt a position in which a movement of the locking device (20) towards the locked position is prevented by the force-exerting device (50).

8. Locking system according to claim 6, characterised by the following features:
the force-exerting device (50) is a spring element; and
the drive device moves the locking device (20) from the locked position into the unlocked position against the force exerted by the spring element (50).

9. Locking system according to claim 4, characterised in that the locking system further comprises
a cover flap (60) which can be moved between a closed position in which the cover flap (60) closes the plug coupling device (100), and an open position in which the plug (10) can be coupled with the plug coupling device (100), and
a rocker (70), by which the coupling element (41) is coupled with the cover flap (60).

10. Locking system according to claim 9, characterised by the following features:
the rocker (70) can be pivoted about a pivot axis (73);
the rocker (70) comprises a first link pin (71) and a second link pin (72);
the coupling element (41) comprises a coupling element connecting link (42), into which the first link pin (71) of the rocker (70) is displaceably guided;
the cover flap (60) comprises a cover flap connecting link (61), into which the second link pin (72) of the rocker (70) is displaceably guided.

11. Locking system according to claim 9, characterised in that the coupling element (41), the rocker (70) and the cover flap (60) are configured such that
in the closed position of the cover flap (60), the locking device (20) is in the locked position; and
in the open position of the cover flap (60), the locking device (20) can be brought into the unlocked position.

12. Locking system according to claim 11, characterised in that when the locking device (20) is transferred from the unlocked position into the locked position, the cover flap (60) remains in the open position.

13. Locking system according to claim 11, characterised in that when the locking device (20) is transferred from the unlocked position into the locked position, the cover flap (60) is moved towards the closed position by a predetermined distance and/or by a predetermined angle.

14. Locking system according to claim 13, characterised in that when the cover flap (60) has been moved towards the closed position by the predetermined distance and/or by the predetermined angle, the cover flap connecting link (61) and the rocker (70) adopt a position in which, when the cover flap (60) is moved towards its open position, the rocker (70) is not actuated by the cover flap connecting link (61), so that the rocker (70) remains in its position and the locking device (20) coupled with the rocker (70) by the coupling element (41) remains in the locked position.

15. Locking system according to claim 9 characterised in that, in the closed position of the cover flap (60), the cover flap connecting link (61) and the rocker (70) adopt a position in which they are blocked against rotation during the manual introduction of force via the cover flap (60), so that a transfer of the cover flap (60) into the open position is prevented.

16. Locking system according to claim 1, characterised in that the direction of movement of the locking device (20) is oriented vertically to the insertion direction of the plug (10) into the plug coupling device (100).

17. Locking system according to claim 1, characterised in that the locking device (20) has an impact surface (24) which is oriented vertically to the direction of movement of the locking device (20).

18. Locking system according to claim 17, characterised in that the coupling element (41) is configured as a tappet which can act on the impact surface (24) of the locking device (20).

19. Plug coupling device (100) having a housing (80) and a locking system according to claim 1, the locking system being arranged in the housing (80).

20. Plug coupling device (100) according to claim 19, characterised by the following features:
the cover flap (60) further comprises at least one link pin (62);
the housing (80) comprises at least one connecting link (86);
the cover flap link pin (62) is guided displaceably in the housing connecting link (86);
the housing connecting link (86) is formed such that when the cover flap (60) is transferred from the closed position into the open position, the movement of the cover flap (60) comprises a rotational movement component and a displacement movement component.

* * * * *